(12) United States Patent
Kaiser et al.

(10) Patent No.: US 9,333,930 B2
(45) Date of Patent: May 10, 2016

(54) COLLISION PROTECTION METHOD AND COLLISION PROTECTION DEVICE FOR A DISPLACEABLE VEHICLE PART AND VEHICLE HAVING THE COLLISION PROTECTION DEVICE

(71) Applicant: BROSE FAHRZEUGTEILE GMBH & CO. KG, HALLSTADT, Hallstadt (DE)

(72) Inventors: Jan Kaiser, Bayreuth (DE); Andre Carl, Ebersdorf (DE); Silvio Schatke, Bad Staffelstein (DE); Thomas Weingaertner, Memmelsdorf (DE); Dalibor Rietdijk, Wetzlar (DE)

(73) Assignee: Brose Fahrzeugteile GmbH & Co. Kommanditgesellschaft, Hallstadt, Hallstadt (DE)

( * ) Notice: Subject to any disclaimer, the term of this patent is extended or adjusted under 35 U.S.C. 154(b) by 0 days.

(21) Appl. No.: 14/299,148

(22) Filed: Jun. 9, 2014

(65) Prior Publication Data

US 2014/0365079 A1 Dec. 11, 2014

(30) Foreign Application Priority Data

Jun. 8, 2013 (DE) .......................... 10 2013 009 673

(51) Int. Cl.
*B60R 21/00* (2006.01)
*B60R 21/013* (2006.01)
(52) U.S. Cl.
CPC ....... *B60R 21/013* (2013.01); *B60R 2021/0006* (2013.01)

(58) Field of Classification Search
USPC ........................ 701/36, 45–47; 293/102, 107; 280/734–735; 340/500, 435–435, 438; 180/232, 281
See application file for complete search history.

(56) References Cited

U.S. PATENT DOCUMENTS

| 4,612,729 | A | * | 9/1986 | Sato | .................... E05D 15/1047 49/280 |
| 5,536,061 | A | * | 7/1996 | Moore | ...................... B60J 5/06 296/155 |
| 5,833,301 | A | * | 11/1998 | Watanabe | ............. E05F 15/646 296/155 |
| 6,452,533 | B1 | * | 9/2002 | Yamabuchi et al. | ............ 342/70 |
| 7,089,114 | B1 | * | 8/2006 | Huang | .......................... 701/301 |
| 8,356,687 | B2 | * | 1/2013 | Baumann et al. | ............. 180/274 |

(Continued)

FOREIGN PATENT DOCUMENTS

DE 102011082545 A1 3/2013
EP 1467057 A2 10/2004

*Primary Examiner* — Yonel Beaulieu
(74) *Attorney, Agent, or Firm* — Laurence A. Greenberg; Werner H. Stemer; Ralph E. Locher

(57) ABSTRACT

In the case of a collision protection method for a displaceable vehicle part of a vehicle, during the displacement of the vehicle part, a focused light beam is deflected by a light deflection unit along a predefined scanning path and reflected radiation of the same light beam is detected by a light-sensitive sensor to scan a travel path region upstream from the vehicle part. The presence or absence of an obstruction in the upstream travel path region is concluded on the basis of the reflected radiation, wherein the displacement is stopped or reversed if an obstruction is recognized in the upstream travel path region.

16 Claims, 4 Drawing Sheets

(56) References Cited

U.S. PATENT DOCUMENTS

| | | | |
|---|---|---|---|
| 2002/0153744 A1* | 10/2002 | Long | B60J 5/06 296/155 |
| 2003/0030299 A1* | 2/2003 | Cleland | E05F 1/1091 296/146.8 |
| 2004/0124662 A1* | 7/2004 | Cleland | E05F 1/1091 296/146.4 |
| 2004/0200149 A1 | 10/2004 | Dickmann et al. | |
| 2005/0161921 A1* | 7/2005 | Higuchi | 280/735 |
| 2006/0028037 A1* | 2/2006 | Kashiwagi et al. | 293/120 |
| 2006/0181108 A1* | 8/2006 | Cleland | E05F 15/63 296/146.4 |
| 2009/0108598 A1* | 4/2009 | Takahashi | 293/107 |
| 2014/0292557 A1* | 10/2014 | Ajala | 342/107 |

\* cited by examiner

COLLISION PROTECTION METHOD AND COLLISION PROTECTION DEVICE FOR A DISPLACEABLE VEHICLE PART AND VEHICLE HAVING THE COLLISION PROTECTION DEVICE

CROSS-REFERENCE TO RELATED APPLICATION

This application claims the priority, under 35 U.S.C. §119, of German application DE 10 2013 009 673.1, filed Jun. 8, 2013; the prior application is herewith incorporated by reference in its entirety.

BACKGROUND OF THE INVENTION

Field of the Invention

The invention relates to a collision protection method for a displaceable vehicle part. Furthermore, the invention relates to a collision protection device for such a vehicle part. Furthermore, the invention relates to a vehicle.

During the displacement, i.e., in particular opening or closing, of displaceable vehicle parts, the risk generally exists that individuals or objects will be pinched or will collide with the moving vehicle part. This can result in injuries, but also in damage to the vehicle part or the object colliding therewith. Modern motor vehicles therefore frequently have so-called pinch protection devices (also referred to as a pinch protector in short), which monitor a displacement of a displaceable vehicle part—in particular driven by a positioning motor. Specifically, the pinch protector is provided for the purpose of stopping or reversing the displacement if an object or body part is pinched or runs the risk of being pinched between the vehicle part and the stationary vehicle frame, for example, a closing edge against which the vehicle part stops.

The pinch protector frequently contains a capacitive sensor. The capacitance measured by the sensor generally contains in this case an item of information about the distance of the vehicle part to the closest object. The closest object is, for example, in failure-free operation, the closing edge of the vehicle or—in case of pinching—an object or body part arranged between the vehicle part and the closing edge. The pinch protector progressively compares the detected capacitance or the distance value ascertained therefrom to a shutoff value, in order to stop or reverse the displacement if the shutoff value is exceeded.

The detection of an obstruction by the capacitive sensor has the advantage in this case that the displacement of the vehicle part can be stopped or reversed already before contact with the obstruction. However, it is disadvantageous that usually only the immediate surroundings of the vehicle part are monitored by the capacitive sensor, i.e., only a short distance to an obstruction can be detected. In the case of long travel path lengths or high displacement velocities, which frequently occur during the opening or closing of vehicle doors, only a comparatively short reaction time is therefore available for recognizing the obstruction. In particular, moving obstructions often cannot be recognized in a timely manner.

SUMMARY OF THE INVENTION

The invention is therefore based on the object of specifying an improved collision protection method and a corresponding improved collision protection device.

This object is achieved according to the invention by a collision protection method. In addition, the object is achieved according to the invention by a collision protection device. Furthermore, the object is achieved according to the invention by a vehicle having the collision protection device. Advantageous embodiments and refinements of the invention, some of which are inventive per se, are described in the dependent claims and the following description.

In the collision protection method according to the invention for a displaceable vehicle part of a vehicle (also in short hereafter: displacement part), during the displacement of the displacement part, a travel path region upstream from the displacement part is scanned by a focused light beam along a predefined scanning path, i.e., the light beam is guided along a straight line (line) or a curved line over the travel path region. Furthermore, reflected radiation of the focused light beam is detected by a light-sensitive sensor. The presence or absence of an obstruction in the upstream travel path region is concluded on the basis of the detected radiation. In this case, the displacement is stopped when an obstruction is recognized in the upstream travel path region.

The travel path contains the spatial volume which the displacement part passes through during a positioning operation. The upstream travel path region contains in this case the part of the travel path which the displacement part is still to cover in a running positioning operation (i.e., the spatial volume which the displacement part will still pass through).

The scanning path describes the deflection of the light beam during the scanning operation. The scanning path can be specified, for example, by the time-dependent curve of the emission angle, at which the light beam is emitted into the three-dimensional space. Equivalently, the scanning path can be specified by the area which the light beam passes through during the scanning operation or by the line of the points at which the light beam penetrates an area oriented transversely to the beam direction during the scanning operation.

The analysis of the detected reflected radiation with respect to the presence or absence of the obstruction can be performed in the scope of the invention via triangulation, for example. In this case, the incidence position of the reflected, focused light beam on the light-sensitive sensor, which is implemented in this case as a pixel array (CCD sensor), for example, is ascertained by analyzing the individual pixels of the sensor. In consideration of the angle at which the focused light beam is emitted and the distance between the light source and the sensor, the distance to the object reflecting the light beam is calculated on the basis of the incidence position on the sensor. On the basis of the ascertained distance to the object, it is subsequently determined whether the object is arranged within the travel path region and therefore represents an obstruction for the displacement. Alternatively, the distance to a potential obstruction is ascertained, for example, by interferometry or a runtime measurement of the (in particular pulsed) emitted and subsequently received light beam.

The collision protection method according to the invention is preferably applied during the displacement, in particular during the opening, of a vehicle door. Fundamentally, the collision protection method according to the invention is already advantageous in the case of a manual displacement of the vehicle door. In this case, upon the presence of the obstruction, an alarm is preferably triggered and/or a brake is actuated, which prevents a further movement of the vehicle door. However, the collision protection method is particularly expedient if the vehicle door is moved (automatically) by an electrical positioning motor. In this case, alternatively to stopping the displacement upon the presence of an obstruction, the displacement of the vehicle door can also be reversed, i.e., the vehicle door can be moved in the opposite direction. For assistance when exiting in a tight parking situation, for example, in a parking garage, it is additionally conceivable in the scope of the invention that the vehicle door is opened almost up to the obstruction and held at this position. Striking against an adjacent vehicle or a parking garage wall during the exit or entry of an individual can thus be effectively prevented.

The use of a focused light beam for scanning the travel path region offers the advantage that the light beam has a particularly long range. For the case in which the displacement part is the vehicle door, the vehicle surroundings can thus also be scanned at a particularly long distance from the vehicle. The entire upstream travel path region, which is generally particularly large in the case of vehicle doors to be pivoted open or closed, can thus advantageously already be checked for the presence of obstructions at the beginning of the displacement. It is additionally advantageous that as a result of the long range of the light beam, objects which approach the vehicle door outside the travel path region, for example, other vehicles, bicyclists, or pedestrians, can also be recognized early.

In a particularly preferred embodiment of the collision protection method, the upstream travel path region is scanned in a planar form, i.e., along a scanning path which contains deflections of the light beam in two spatial directions perpendicular to one another, so that the light beam passes over an area oriented transversely to the beam direction. In this case, the light beam is moved in particular along a plurality of lines parallel to one another. The "scanning area" scanned by the light beam preferably corresponds in this case to at least the cross section of the travel path (i.e., the area of the displacement part which is moved in the direction of the displacement). For the case in which the displacement part is a vehicle door, the scanning area (for example, measured at a distance of 2 to 20 cm in front of the vehicle door) therefore corresponds to the entire external surface of the vehicle door. It can thus be ensured in a particularly simple manner that the vehicle door does not collide with an obstruction at any point of its external surface during the displacement.

The focused light beam is expediently deflected by a micro-mirror along the scanning path. The micro-mirror is preferably pivoted by a miniaturized drive, in particular a micro-electromechanical system (MEMS) about one axis or—in the case of the scanning in planar form—about two axes.

In an expedient method embodiment, a laser diode is used as a light source for the light beam. Such a laser diode offers the advantage in this case that an emitted (laser) light beam is generally already focused and strongly collimated, i.e., has light waves oriented nearly in parallel. In one expedient embodiment, an IR laser diode is used, which emits a light beam in the infrared spectral range of the light. Therefore, the light beam used for scanning the upstream travel path region cannot be recognized with the naked eye and is advantageously not perceived to be annoying by individuals. In an alternative method variant, at least one light-emitting diode (LED) is used as a light source.

In particular for optical reasons, a sensor unit which carries the light source and the sensor (and also optionally the micro-mirror) is preferably retracted into the displacement part (for example, the vehicle door) in an idle position, and is therefore not visible or is hardly visible in particular. According to the method, the sensor unit is displaced from the idle position into a collision protection position in this case at the beginning of the displacement of the displacement part. In the collision protection position, the sensor unit protrudes from the displacement part and is in particular arranged on the displacement part such that the entire travel path region can be passed over by the light beam.

If the displacement part is the vehicle door, the sensor unit is preferably pivoted or moved in this case from the idle position into the collision protection position from a narrow side of the vehicle door carrying the door lock.

To be able to prevent a collision of the sensor unit with an obstruction, in an expedient method variant, the region upstream of the sensor unit is already scanned by the focused laser beam during the displacement of the sensor unit, i.e., already before reaching the collision protection position. This is advantageous in particular for the case in which an obstruction is arranged sufficiently close to the displacement part that it would collide with the sensor unit during the pivoting or extension of the sensor unit.

Alternatively to the use of infrared light, in one method variant, a wavelength in the range of the visible spectral range of the light is used as the wavelength of the light beam. The light beam can thus be perceived by individuals who are located inside or outside the vehicle. The light beam per se can advantageously be comprehended in this case as a signal which does not stay within the region passed over by the light beam.

In a further method variant, the wavelength of the light beam (simplified: its light color) is varied as a function of the presence or absence of the obstruction in the travel path region. For this purpose, a switchover is performed between at least two laser diodes or LEDs, which respectively emit light having differing light color in the visible spectral range. For example, during the displacement of the displacement part, light of a specific color is emitted as long as no obstruction is detected in the travel path region, and light of another color is emitted as soon as an obstruction is detected. In the scope of the invention, it is conceivable in this case that green is used as the light color as long as no obstruction is detected in the travel path region. For the case in which an obstruction penetrates into the travel path region during the displacement, light having red light color is used for the scanning. The use of different light colors advantageously unfolds a signal effect for the individual operating the displacement part. If the displacement part is the vehicle door, for example, the individual can therefore actively interrupt the displacement when he recognizes that an object in front of the vehicle door is irradiated using red light.

Additionally or alternatively, the color of the light is varied in dependence on the distance of the displacement part from the obstruction. In particular, an illumination similar to a traffic signal of the travel path region is conceivable in the scope of the invention. In this case, for example, in the case of an obstruction having a comparatively large distance to the displacement part, a switchover is made from green to orange light color. In the event of a shortening of the distance or a distance which is considered to be particularly risky for a collision with the obstruction (for example, less than 20 cm), a change is made to red light color.

As an alternative to the described multicolored illumination of the travel path region by use of the light beam used for scanning itself, multiple additional light sources (in particular light-emitting diodes) can also be used in the scope of the invention, which illuminate the travel path region scattered in a planar manner. The travel path region is preferably scanned by an IR laser diode in this case.

Furthermore, it is also conceivable in the scope of the invention that a geometrical symbol is projected on a surface within the travel path region of the displacement part, for example, on the obstruction itself. The projection is performed in particular by targeted deflection of the focused light beam. The geometrical signal is, for example, a warning signal, for example, an exclamation point. Such a warning symbol can be used alternatively or additionally to the changing light colors.

The collision protection device according to the invention for the displacement part contains a sensor unit. The sensor unit has a light source for a focused light beam, a light deflection unit for deflecting the focused light beam, and a light-sensitive sensor for detecting reflected beams (preferably the reflected light beam itself). In the scope of the invention, a focusing unit, for example, a lens, for focusing the light beam can additionally be integrated in the light source.

The collision protection device additionally has a control and analysis unit, which is configured by control or programming technology for the purpose of carrying out the collision protection method of the above-described type, preferably automatically. The control and analysis unit can be implemented in the scope of the invention as a non-programmable electronic circuit and can be integrated in this case in a controller of a displacement motor which drives the displacement part, for example. However, the control and analysis unit is preferably formed by a microcontroller, in which the functionality for carrying out the collision protection method according to the invention is implemented in the form of a software module. The software module can form in this case in particular a component of comprehensive control software (firmware) of the controller of the positioning motor for the displacement part.

In a preferred embodiment, the light deflection unit is a micro-mirror, which is pivotable about at least one axis, preferably about two axes perpendicular to one another. In a particularly preferred and compact embodiment, the micro-mirror is implemented as part of a MEMS component and is pivotable, for example, by multiple so-called comb drives. Such a MEMS micro-mirror can advantageously be displaced with particularly high speed and nonetheless precisely. A particularly high scanning speed and therefore a short reaction time are thus achieved, so that a moving obstruction can also be recognized early.

The displacement part is preferably a vehicle door. The vehicle door can be in this case both a side door, which is pivoted about a pivot axis aligned approximately vertically, i.e., perpendicularly to the roadway, or a gull-wing door or luggage compartment door, which is pivoted about a pivot axis aligned approximately horizontally. The vehicle door is preferably movable by a positioning motor between its closed position and an open position. Alternatively, however, the vehicle door has at least one brake device, to which the collision protection device is coupled, so that the displacement can be stopped upon the presence of an obstruction in the travel path region.

In a particularly simple embodiment of the collision protection device, the sensor unit is integrated in a decorative strip of the vehicle door, in particular the side door. In this case, it can also be conceivable in the scope of the invention that the collision protection device contains multiple sensor units, which are arranged along the decorative strip.

In a preferred embodiment of the collision protection device, however, the sensor unit is, in the intended installation state, arranged on the narrow side of the vehicle door, which carries the door lock. The sensor unit is preferably displaceable in this case by a sensor positioning device from an idle position retracted into the vehicle door into a collision protection position protruding beyond the outer side of the vehicle door. In the collision protection position, the sensor unit is preferably arranged such that during the opening of the vehicle door, the upstream travel path region in the opening direction can be scanned by the (focused) laser beam. The lock side of the vehicle door passes over the largest travel route during a pivot of the vehicle door (in comparison to the hinge side). Sufficient space for pivoting out or extending the sensor unit is thus already available on the lock side in the case of a small opening of the vehicle door, i.e., a small opening angle in relation to the closed position.

In an optional and advantageous embodiment, the sensor unit is installed on the lock side of the vehicle door such that the sensor unit is displaceable into a pinch protection position, which points towards the inner side of the vehicle door. In the pinch protection position, the travel path region upstream from the vehicle door in the closing direction, i.e., the region between the closing edge and the vehicle door, can be scanned by the light beam. The collision protection device can therefore be used both during opening of the vehicle door (to protect against striking against an obstruction) and also as a pinch protector during closing of the vehicle door.

In a preferred embodiment, the light source is a laser diode, which emits light in the infrared spectral range, for example. Alternatively, the light source is an LED, to which one or more lenses for beam shaping (collimation and focusing) are expediently assigned.

In a further embodiment, the collision protection device contains an additional illumination unit, which is preferably arranged on the sensor unit. The illumination unit contains at least one light source (for example, an LED) for the emission of visible light. The illumination unit is configured in particular for the purpose of emitting the light essentially in the same direction as the focused light beam. "Essentially in the same direction" means here and hereafter that when the displacement part is displaced and the upstream travel path region (also referred to as the opening region when opening the vehicle door) is scanned by the focused light beam, the light is also emitted into the upstream travel path region. If the displacement part is the vehicle door, scanning and illumination of the closing path region can also be performed in the scope of the invention during the closing of the vehicle door. The illumination unit optionally contains multiple light sources, which respectively emit light of different light colors.

The vehicle according to the invention contains at least one vehicle door and a collision protection device assigned thereto of the above-described type.

Other features which are considered as characteristic for the invention are set forth in the appended claims.

Although the invention is illustrated and described herein as embodied in a collision protection method and a collision protection device for a displaceable vehicle part and a vehicle having the collision protection device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL
VIEWS OF THE DRAWING

DETAILED DESCRIPTION OF THE INVENTION

Parts corresponding to one another are always provided with identical reference signs in all figures.

Figure 1:
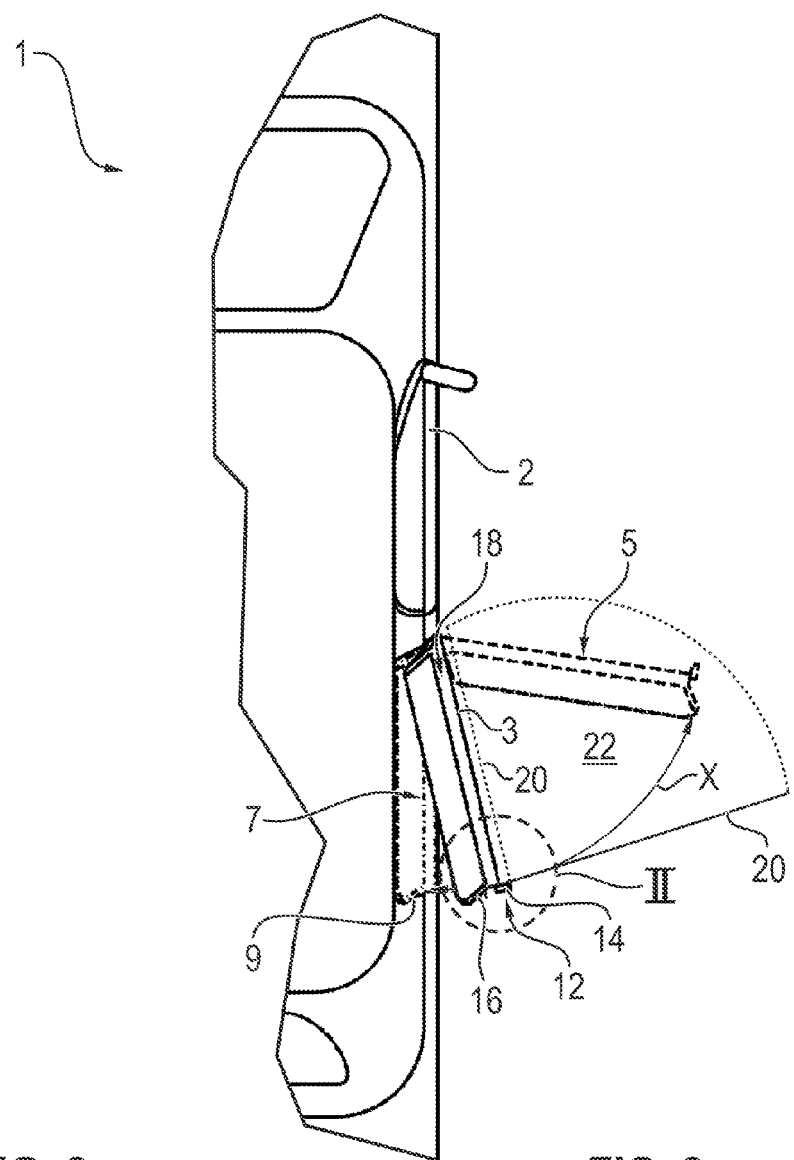
FIG. 1 is a diagrammatic, top plan view of a vehicle roof having a front side door, a partially open rear side door, and a collision protection device, which has a sensor unit arranged on the rear side door, wherein a travel path region upstream from the rear side door toward an outer side is monitored for an obstruction by the sensor unit according to the invention.

Referring now to the figures of the drawings in detail and first, particularly to FIG. 1 thereof, there is shown a vehicle 1, which is implemented as a sedan, and which therefore has a front vehicle door (front door 2) and a rear vehicle door (rear door 3) on each longitudinal side. In FIG. 1, the rear door 3 is shown partially open. In other words, the rear door 3 is in an intermediate position between an open position 5 (indicated by dashed lines), in which the rear door 3 stands away from the vehicle 1 at an angle between approximately 70° and 90°, and a closed position 7, in which the rear door 3 stops against a closing edge 9 of the vehicle body (indicated by dot-dash lines). The front door 2 is also displaceable in a corresponding manner. The front door 2 and the rear door 3 therefore each form a displaceable vehicle part.

Figure 4:
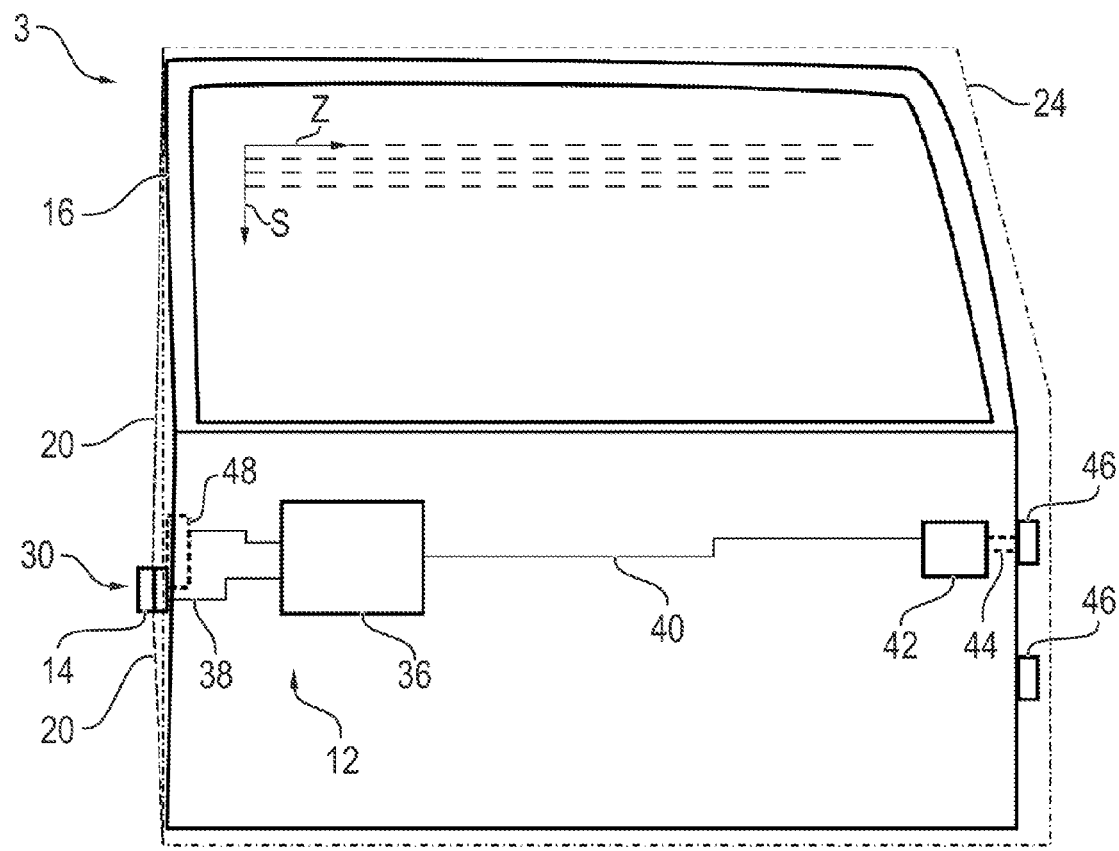
FIG. 4 is a side view of the rear side door having the collision protection device and the sensor unit.

For the displacement between the closed position 7 and the open position 5, the rear door 3 is pivoted out (or pivoted in) along a travel path X. To prevent the rear door 3 from colliding with an obstruction (for example, an adjacent vehicle, a parking garage wall, a passerby, etc.) during opening (displacement along the travel path X into the open position 5), the vehicle 1 has a collision protection device 12 (FIG. 4). The collision protection device 12 contains a sensor unit 14, which is arranged on a rear edge 16 of the rear door 3 during opening of the rear door 3. The sensor unit 14 protrudes beyond an outer surface 18 of the rear door 3 in this case and scans a travel path region 22 upstream outwardly from the rear door 3 by a focused light beam 20. The travel path region 22 corresponds in this case to the region which the rear door 3 will still pass over during the displacement between the closed position 7 and the open position 5.

The sensor unit 14 deflects the light beam 20 along a plurality of lines displaced in parallel to one another over the travel path region 22, so that a scanning surface 24 (see dot-dash line in FIG. 4) upstream from the rear door 3 is scanned in a planar manner using the light beam 20. The scanning of the travel path region 2 along multiple lines displaced in parallel to one another is indicated in FIG. 2 by perpendicular crossed arrows 26.

Figure 2:
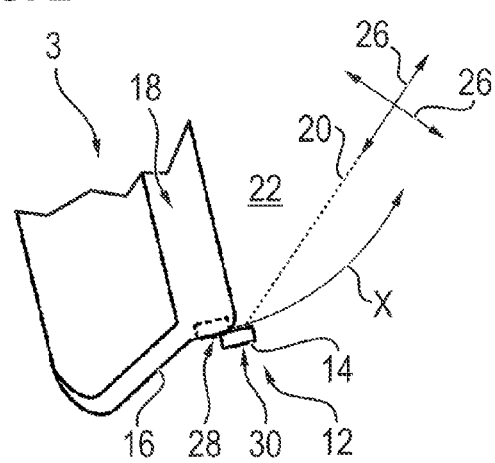
FIG. 2 is an enlarged view of detail II shown in FIG. 1 of the rear side door having the sensor unit in a collision protection position.

Furthermore, it can be seen from FIG. 2 that the sensor unit 14 is pivotable from an idle position 28 into a scanning position (referred to hereafter as a collision protection position 30). In the idle position 28, the sensor unit 14 is arranged retracted in relation to the outer surface 18 of the rear door 3 in the region of the rear edge 16. The sensor unit 14 is pivoted in this case against a narrow side of the rear door 3 extending along the rear edge 16, on which the door lock of the rear door 3 is also arranged. To arrange the control unit 14 in a concealed manner, it is embedded in the narrow side of the rear door 3 in the idle position 28.

During opening of the rear door 3, as soon as it is opened by a slight gap from the closed position 7 in the direction of the open position 5, the sensor unit 14 is pivoted out into the collision protection position 30. In the collision protection position 30, the sensor unit 14 is mounted on the rear edge 16 such that the light beam 20 can fully scan the scanning surface 24.

Figure 3:
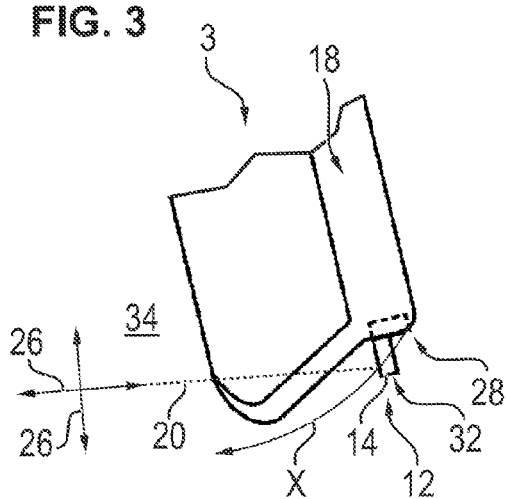
FIG. 3 is a view of the sensor unit in a pinch protection position in a view according to FIG. 2.

In an optional exemplary embodiment, as shown in FIG. 3, the sensor unit 14 can be pivoted into a pinch protection position 32 during closing of the rear door 3. In the pinch protection position 32, the sensor unit 14 is arranged on the rear edge 16 such that the light beam 20 can scan a closing path region 34 arranged between the closing edge 9 and the rear door 3 in a planar form. An object or body part can thus be prevented from being pinched between the rear door 3 and the closing edge 9.

It can be recognized from FIG. 4 that the collision protection device 12 contains a control and analysis unit 36 in addition to the sensor unit 14. The control and analysis unit 36 is connected via a signal line 38 to the sensor unit 14. Furthermore, the control and analysis unit 36 is connected in circuitry via a control line 40 to a door positioning motor 42. The door positioning motor 42 acts via a door mechanism 44 on a door hinge 46, to move the rear door 3 along the travel path X. Furthermore, the control and analysis unit 36 is connected in circuitry to a sensor positioning unit 48, which is provided for the purpose of moving the sensor unit 14 from the idle position 28 into the collision protection position 30 or into the pinch protection position 32 upon a positioning signal of the control and analysis unit 36.

Figure 5:
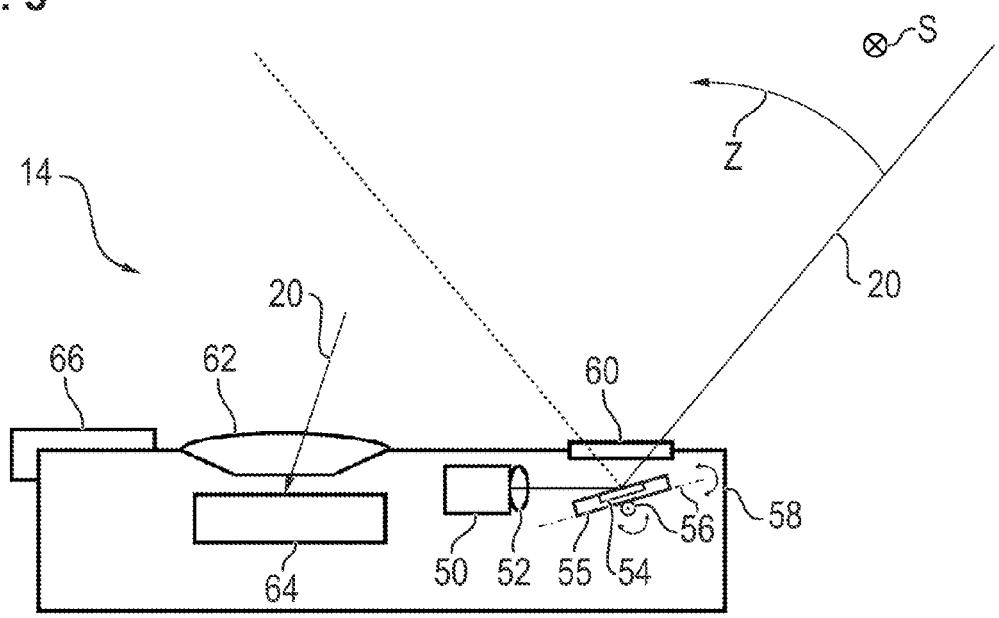
FIG. 5 is a schematic illustration of the sensor unit.

To generate the light beam 20, the sensor unit 14, as shown in FIG. 5, contains as a light source a laser diode 50 having a collimator lens 52 connected upstream, which is provided for the purpose of parallelizing (collimating) the light beam 20. Furthermore, the sensor unit 14 contains as a deflection unit a micro-mirror 54, which is mounted so it is pivotable about two axes 56 perpendicular to one another. The micro-mirror 54 is implemented in this case as a component of a so-called MEMS component 55, which has multiple micro-electric drives for pivoting the micro-mirror 54. The light beam 20 is projected by the laser diode 50 on the micro-mirror 54. The light beam 20 is deflected in line form along a line direction Z by the micro-mirror 54, and also perpendicularly to the line direction Z in a layer direction S.

The sensor unit 14 has a sensor housing 58 for mounting the laser diode 50 and the MEMS component 55. The light beam 20 exits in this case through an exit window 60 out of the sensor housing 58. The sensor unit 14 has an incidence window 62 in its sensor housing 58 for detecting reflected radiation of the light beam 20. The reflected light beam 20 is incident through the incidence window 62 on a light-sensitive sensor 64 of the sensor unit 14, which is implemented as a two-dimensional CCD array, for example.

A pivot coupling 66 is formed on the sensor housing 58 for coupling the sensor unit 14 to the sensor positioning unit 48.

The control and analysis unit 36 is configured by programming for the purpose of inferring a distance between the rear door 3 and a closest object during opening of the rear door 3 from the radiation received by the sensor 64. In failure-free operation of the collision protection device 12, such an object is, for example, an object or person who is arranged outside the travel path region 22 in the surroundings of the vehicle 1. The object or the person therefore cannot collide with the rear door 3 during the opening thereof. During the closing of the rear door 3, the closing edge 9 forms this closest object in failure-free operation. The control and analysis unit 36, for example, activates the laser diode 50 such that it emits the light beam 20 in pulsed form and calculates from the runtime, i.e., from the time offset between the emission of a light pulse and the detection of the same light pulse, the distance between the rear door 5 and the closest object. Alternatively, for example, the distance can also be determined by triangulation. The closest object is only considered to be an obstruction by the control and analysis unit 36, however, if its distance to the rear door 3 is sufficiently small that the object is arranged within the travel path region 22. To avoid striking of the rear door 3 on the obstruction arranged in the travel path region 22 during opening and nonetheless to allow a vehicle occupant to exit from the vehicle 1, the control and analysis unit 36 is configured for the purpose of activating the door positioning motor 42 until the rear door 3 is arranged at a minimum distance, for example, 5 cm, to the obstruction.

The control and analysis unit 36 is furthermore configured for the purpose, during closing of the rear door 3, of ascertaining, by the sensor unit 14, the distance of the rear door 3 to the closing edge 9 or an object arranged between the rear door 3 and the closing edge 9 and to stop or reverse the closing of the rear door 3 with application of a known pinch protection method if an obstruction is recognized between the rear door 3 and the closing edge 9. The monitoring of the closing path region 34 occurs in this case until the rear door 3 is arranged so close to the closing edge 9 that the sensor unit 14 must be pivoted into the idle position 28.

Figure 6:
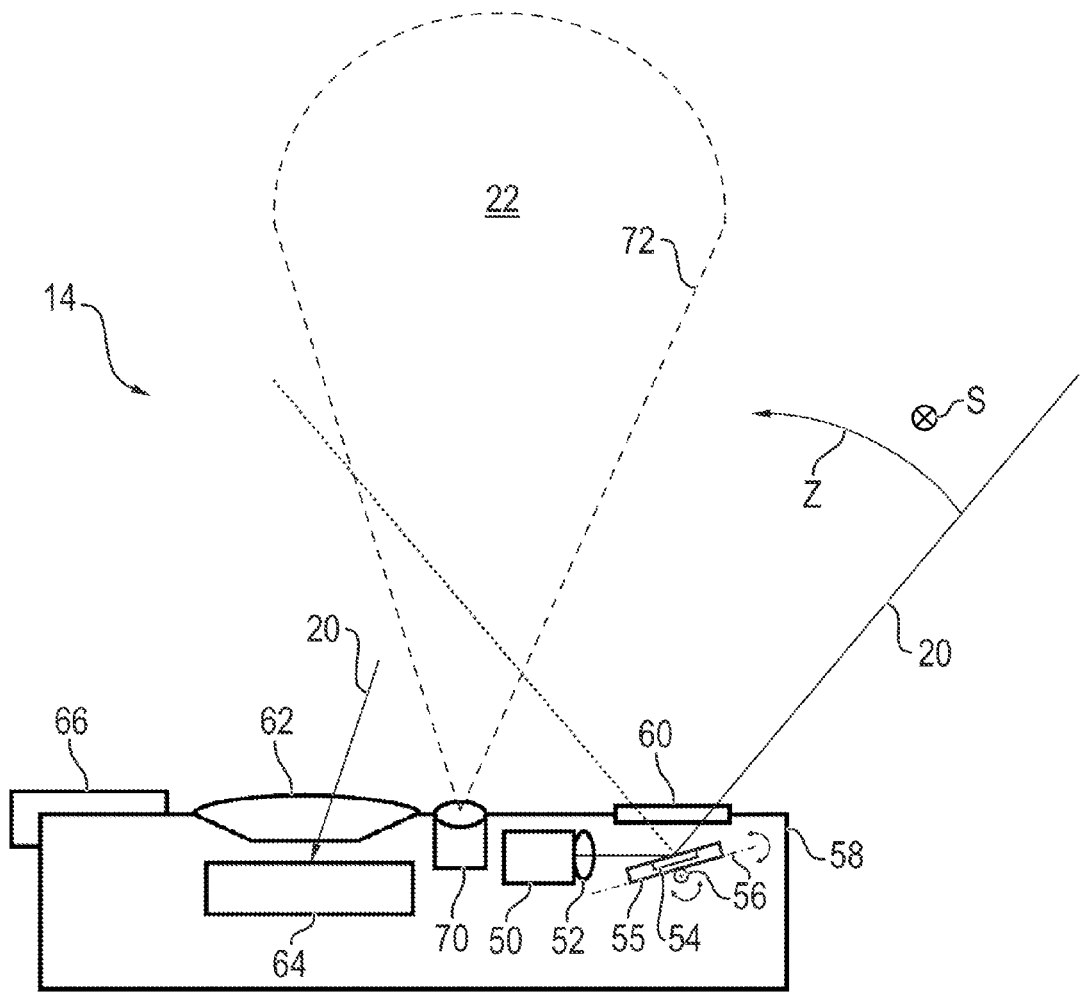
FIGS. 6 and 7 are illustrations showing an alternative exemplary embodiment of the collision protection device.
Figure 7:
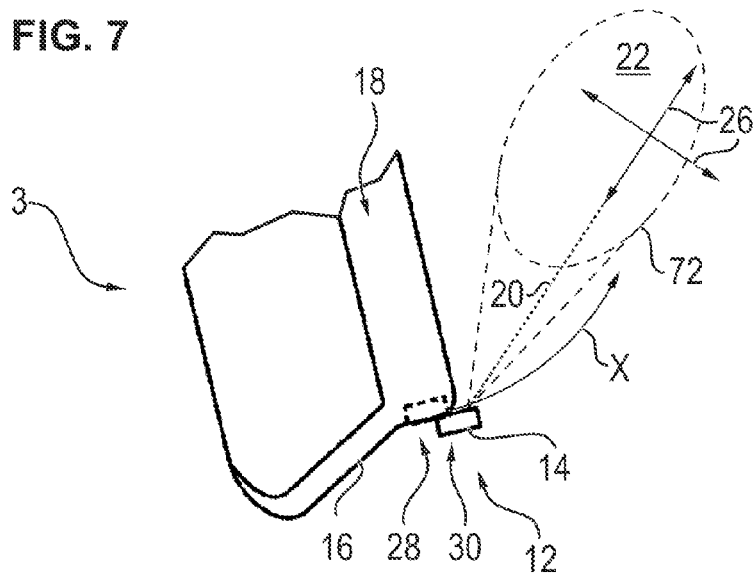

An alternative exemplary embodiment of the sensor unit 14 is shown in FIGS. 6 and 7. The sensor unit 14 has in this case an additional illumination unit 70. The illumination unit 70 contains two LEDs (not shown in greater detail), which respectively emit light having green and red light color. The illumination unit 70 is arranged in the sensor housing 58 such that the LEDs of the illumination unit 70 emit their light into the travel path region 22 during an opening of the rear door 3 (indicated by beam cone 72). The control and analysis unit 36 activates the illumination unit 70 such that the travel path region 22 is illuminated with green light in failure-free operation. The vehicle occupant who opens the rear door 3 or a passerby standing outside is thus signaled that the rear door 3 will be opened without risk of collision. Upon the presence of an obstruction within the travel path region 22, the control and analysis unit 36 activates the illumination unit 70 to illuminate the travel path region 22 with red light. It is therefore signaled to the vehicle occupant that an obstruction is located in the travel path region 22 and incomplete opening of the rear door 3 is to be expected. For the case in which the vehicle occupant opens the rear door 3 without assistance by the door positioning motor 42, the vehicle occupant recognizes by way of the red illumination that an obstruction is present, and therefore can end the opening of the rear doors 3 or can open the rear door 3 further with increased attentiveness.

Figure 8:
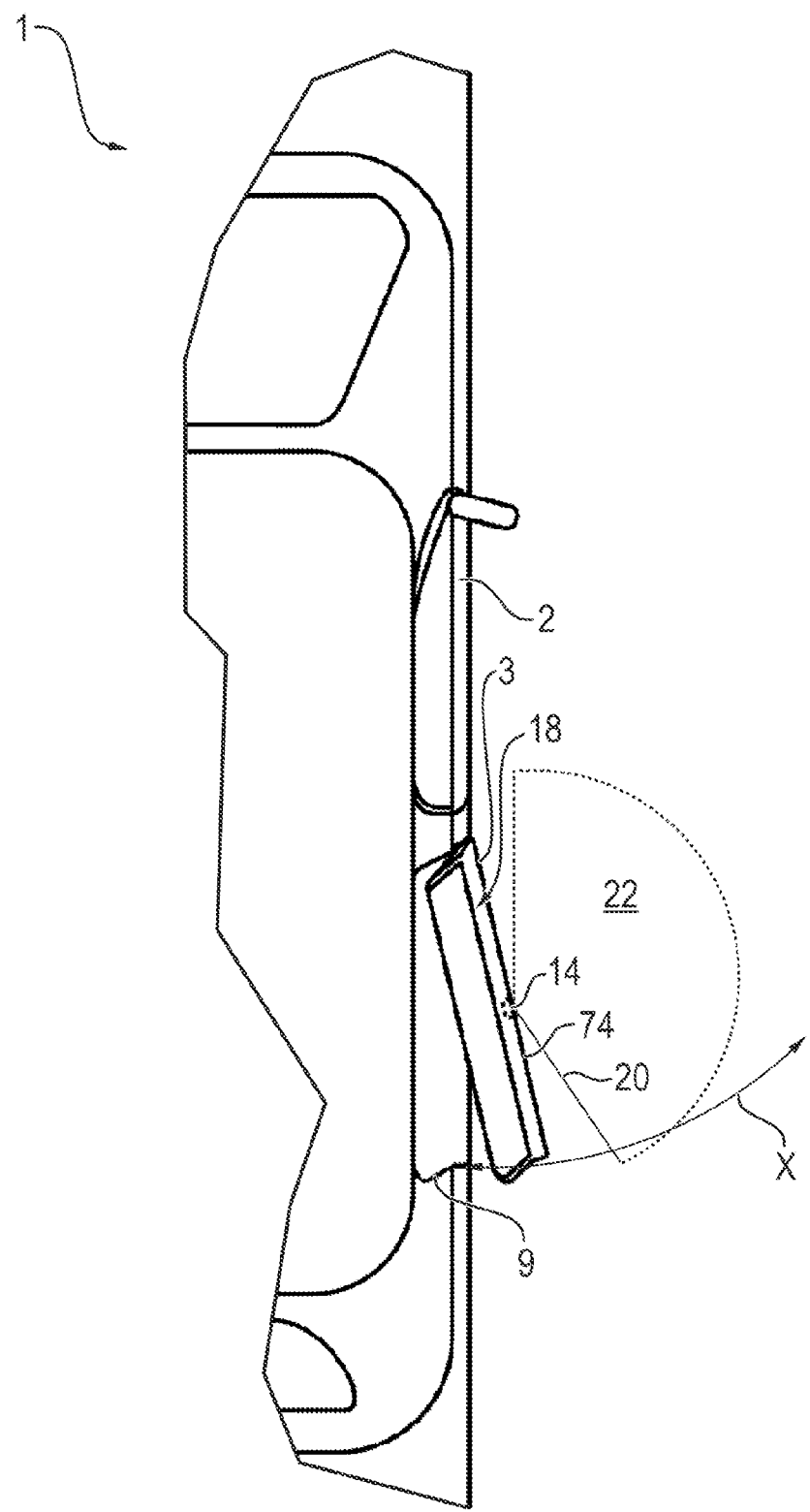
FIG. 8 is a top plan view of an alternative exemplary embodiment of the collision protection device having an alternative arrangement of the sensor unit on the side door.

FIG. 8 shows a further alternative exemplary embodiment of the vehicle 1. The sensor unit 14 is integrated in this case in a decorative strip 74, which extends in the longitudinal direction of the vehicle 1 above the rear doors 3.

The object of the invention is particularly clear from the above-described exemplary embodiments. Nonetheless, the object of the invention is not restricted to the above-described exemplary embodiments. Rather, further embodiments of the invention can be derived by a person skilled in the art from the above description. In particular, the individual features of the invention and the embodiment variations thereof described on the basis of the various exemplary embodiments can also be combined with one another in another manner. The collision protection device 12 and the sensor unit 14 are preferably not only arranged on the rear doors 3, but rather similarly also on the front doors 2.

LIST OF REFERENCE NUMERALS 1 vehicle
2 vehicle door
3 rear door
5 open position
7 closed position
9 closing edge
12 collision protection device
16 rear edge
18 outer surface
20 light beam
22 travel path region
24 scanning area
26 arrow
28 idle position
30 collision protection position
32 pinch protection position
34 closing path region
36 control and analysis unit
38 signal line
40 control line
42 door positioning motor
44 door mechanism
46 door hinge
48 sensor positioning unit
50 laser diode
52 collimator lens
54 micro-mirror
55 MEMS component
56 axis
58 sensor housing
60 exit window
62 incidence window
64 sensor
66 pivot coupling
70 illumination unit
72 beam cone
74 decorative strip
S layer direction
X position
Z line direction

The invention claimed is:
1. A collision protection method for a vehicle door of a vehicle, wherein during a displacement of the vehicle door, performing the following steps of:
  scanning a travel path region upstream from the vehicle door along a predefined scanning path by a focused light beam by displacing a sensor unit carrying a light source for outputting the focused light beam and a sensor, at a beginning of the displacement of the vehicle door, in relation to the vehicle door from an idle position retracted into the vehicle door into a collision protection position protruding from the vehicle door;
  detecting reflected radiation of the focused light beam by a light-sensitive sensor;
  concluding a presence or absence of an obstruction in the travel path region on a basis of the reflected radiation; and
  stopping or reversing the displacement of the vehicle door if the obstruction is recognized in the travel path region.

2. The collision protection method according to claim 1, which further comprises scanning the travel path region in a planar form.

3. The collision protection method according to claim 1, which further comprises deflecting the focused light beam by means of a micro-mirror along at least one multiple line over the travel path region.

4. The collision protection method according to claim 1, which further comprises providing a laser diode as a light source for generating the focused light beam.

5. The collision protection method according to claim 1, which further comprises providing at least one light-emitting diode as a light source.

6. The collision protection method according to claim 1, wherein a region upstream of the sensor unit is already scanned before reaching the collision protection position.

7. The collision protection method according to claim 1, which further comprises using a wavelength in a range of visible light as a wavelength of the focused light beam.

8. The collision protection method according to claim 6, which further comprises varying a wavelength of the focused light beam in dependence on the presence or absence of the obstruction and/or in dependence on a distance to the obstruction.

9. A collision protection device for a vehicle door of a vehicle, the collision protection device comprising:
- a sensor unit having a light source for a focused light beam, a light deflection unit for deflecting the focused light beam, and a light-sensitive sensor for detecting reflected radiation of the focused light beam, said sensor unit disposed on the vehicle door; and
- a control and analysis unit configured to carry out a collision protection method for the vehicle door, wherein during a displacement of the vehicle door, said control and analysis unit programmed to:
  - scan a travel path region upstream from the vehicle door along a predefined scanning path by the focused light beam;
  - detecting the reflected radiation of the focused light beam by said light-sensitive sensor;
  - concluding a presence or absence of an obstruction in the travel path region on a basis of the reflected radiation; and
  - stopping or reversing the displacement of the vehicle door if the obstruction is recognized in the travel path region.

10. The collision protection device according to claim 9, wherein said light deflection unit is a micro-mirror pivotable about at least one axis.

11. The collision protection device according to claim 9, wherein said sensor unit is integrated in a decorative strip of the vehicle door.

12. The collision protection device according to claim 9, wherein said sensor unit is, in a intended installation state, arranged on a narrow side of the vehicle door carrying a door lock and is displaceable from an idle position retracted into the vehicle door into a collision protection position protruding beyond an outer surface of the vehicle door such that during the displacement of the vehicle door into an open position, the travel path region can be scanned in an opening direction by means of the focused light beam.

13. The collision protection device according to claim 12, wherein said sensor unit is displaceable into a pinch protection position, which points towards an inner side of the vehicle door, to scan a closing path region upstream in a closing direction.

14. The collision protection device according to claim 9, wherein said light source is a laser diode or a light-emitting diode.

15. The collision protection device according to claim 9, further comprising an additional illumination unit having at least one light source for emitting light, wherein said additional illumination unit emits light in a same direction as the focused light beam.

16. A vehicle, comprising:
- a vehicle door;
- a collision protection device mounted in said vehicle door, said collision protection device having:
  - a sensor unit having a light source for a focused light beam, a light deflection unit for deflecting the focused light beam, and a light-sensitive sensor for detecting reflected radiation of the focused light beam; and
  - a control and analysis unit configured to carry out a collision protection method for said vehicle door, wherein during a displacement of said vehicle door, said control and analysis unit programmed to:
    - scan a travel path region upstream from said vehicle door along a predefined scanning path by the focused light beam;
    - detecting the reflected radiation of the focused light beam by said light-sensitive sensor;
    - concluding a presence or absence of an obstruction in the travel path region on a basis of the reflected radiation; and
    - stopping or reversing the displacement of the vehicle door if the obstruction is recognized in the travel path region.

* * * * *